Nov. 13, 1923.
G. W. GILLASPY
BAND SAW GUIDE
Filed Nov. 12, 1921
1,474,255
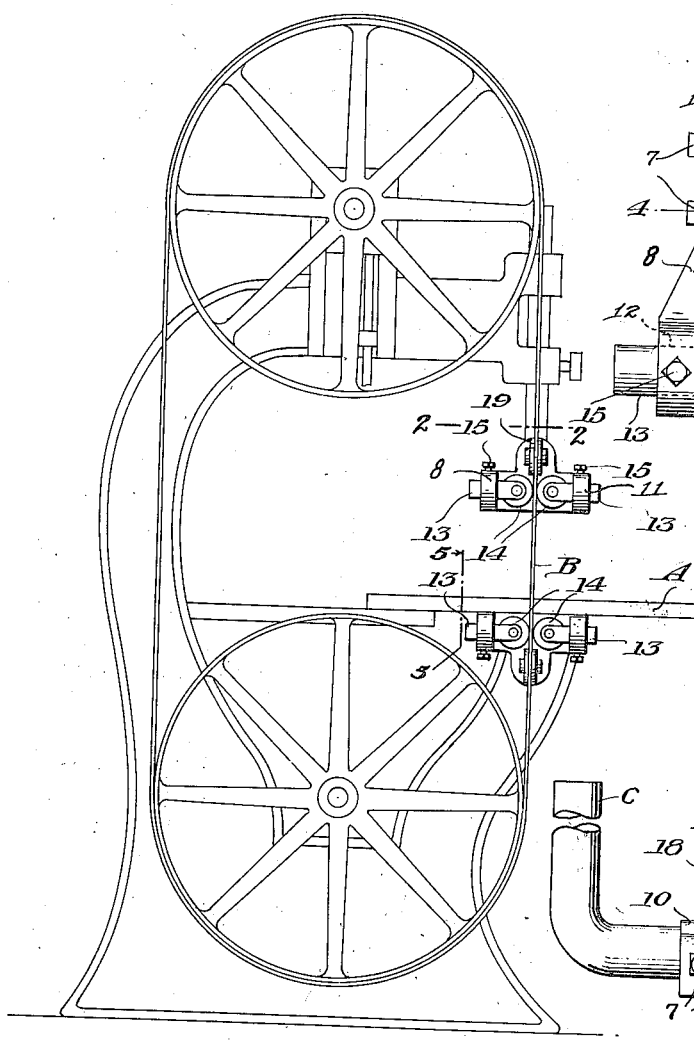
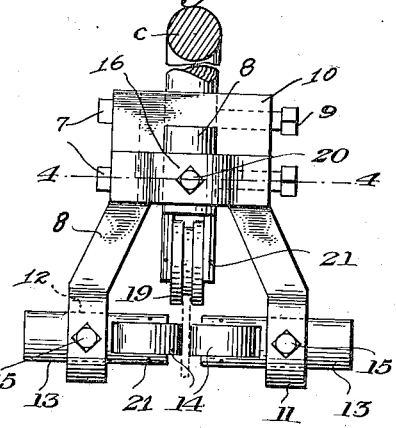
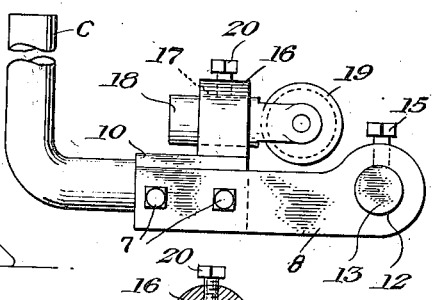
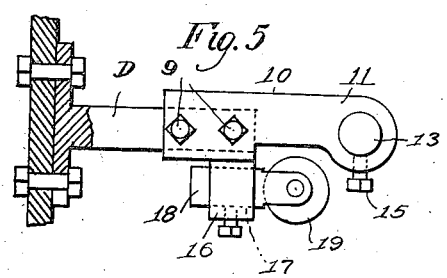
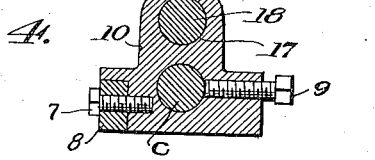
George W. Gillaspy
INVENTOR
BY Victor J. Evans
ATTORNEY Patented Nov. 13, 1923.

1,474,255

UNITED STATES PATENT OFFICE.

GEORGE W. GILLASPY, OF PENDLETON, OREGON.

BAND-SAW GUIDE.

Application filed November 12, 1921. Serial No. 514,720.

*To all whom it may concern:*

Be it known that I, GEORGE W. GILLASPY, a citizen of the United States, residing at Pendleton, in the county of Umatilla and State of Oregon, have invented new and useful Improvements in Band-Saw Guides, of which the following is a specification.

This invention relates to saw guides and has for its object the provision of a novel guide designed to be secured upon the top or bottom of a saw table and including specially constructed and peculiarly arranged guide rollers engageable with not only the sides but also the back edge of a band saw whereby to hold the latter in proper alignment while in use under heavy strain.

An important object is the provision of a guide of this character in which the various roller elements are adjustably mounted whereby to be engageable with saw blades of different thicknesses and different widths.

Another object is the provision of a device of this character which is provided with ample lubricating means for the rollers which, of course, travel at a high speed while the saw is in operation.

An additional object is the provision of a device of this character which will be very simple and inexpensive to manufacture, positive in action, efficient in use, durable in service, and a general improvement in the art.

With the above and other objects and advantages in view, the invention consists in the details of construction to be hereinafter more fully described and claimed and illustrated in the accompanying drawing in which—

Figure 1 is a side elevation of a band saw machine showing my device applied thereto, Figure 2 is a section on the line 2—2 of Figure 1, Figure 3 is a detail side elevation of one of the guide devices, Figure 4 is a detail section on the line 4—4 of Figure 2.

Figure 5 is a sectional view on the line 5—5 of Figure 1.

Referring more particularly to the drawings, the letter A designates a saw table and B represents a band saw operating through an opening in the table in the usual manner. The letter C represents a depending L-shaped rod which is adjustably mounted on the frame of the machine and which is located above the saw table while C indicates a horizontally disposed rod suitably secured on the frame of the machine below the saw table and mounted as for example by the means illustrated in Figure 5.

In carrying out my invention I provide a suitable body 10 which is provided with a hole permitting it to be slidably engaged upon the lower or horizontal end of the rod C, the holding being accomplished by a set screw 9. This mounting refers to the upper guide device though it is of course to be seen that the lower guide device is a duplication of the upper one except that it is arranged in inverted position with respect thereto and is engaged upon the horizontal rod D. In either instance the body 10 is formed with an integral arm 11 and a detachable arm 8 held in place by studs or screws 7. Both arms are formed with holes 12 through which are slidably engaged shanks 13 having bifurcated ends between which are journaled rollers 14 adapted to engage against the sides of the band saw B. The shanks 13 are adjustably mounted so that the rollers 14 may be brought into contact with saws of different thicknesses and the adjustment is maintained by means of suitable set screws 15.

The body 10 also includes a lateral extension 16 which is formed with a bore 17 within which is slidably engaged a shank 18 having a bifurcated end within which is journaled a roller 19 which is grooved, this roller being engageable with the rear edge of the band saw. The shank 18 is adjustably mounted whereby the roller 19 may be brought into contact with a saw blade regardless of the width thereof and the desired adjustment is maintained by a suitable set-screw 20.

As it is apparent that all the rollers will rotate at high speed during the travel of the saw, it is necessary that lubrication be provided. In carrying this out I provide the shanks at the sides of the bifurcations therein, with suitable oil holes 21 which lead to the journals of the rollers and, if preferred, these holes may be left open so that oil may be injected thereinto from an oil can or the like, or may be provided with suitable oil cups of any preferred or conventional construction.

Regardless of whether my device is mounted upon the top of a saw table with the extension 16 disposed upwardly, or whether my device be disposed upon the underside of the table in the reverse position, it will be seen that the roller 19 efficiently operates to brace the rear edge of the saw for tending to hold it rigid while at the same time the cooperating rollers 14 engage against the opposite sides of the saw and further used to hold it rigid so that any tendency to buckle or depart from the true path, will be prevented. It is therefore to be observed that my device will be a great preventer of accidents to the workmen using the saw and it will also decrease the liability of breakage of the saw under heavy strains.

While I have shown and described the preferred embodiment of my invention, it is of course to be understood that I reserve the right to make such changes in the form, construction and arrangement of parts as will not depart from the spirit of the invention or the scope of the subjoined claim.

What is claimed is:—

A band saw guide comprising a bracket adapted to be detachably mounted upon the frame of a band saw machine and including spaced arms terminating in apertured ears, said bracket further including an ear member disposed in a plane at right angles to the plane of the first named ears, stubs slidably mounted through said first named ears and arranged in end to end relation, rollers journaled on the adjacent ends of said stubs and adapted to engage against the sides of a band saw, set screws passing through the first named ears and engaging said stubs for maintaining adjustment thereof, a similar stub slidably mounted through the last named ear and carrying a grooved roller for engaging the back edge of the saw, and a set screw passing through said last named ear and engaging the stub therein for maintaining adjustment thereof.

In testimony whereof I affix my signature.

GEORGE W. GILLASPY.